United States Patent
Madduri et al.

(10) Patent No.: US 9,471,715 B2
(45) Date of Patent: Oct. 18, 2016

(54) ACCELERATED REGULAR EXPRESSION EVALUATION USING POSITIONAL INFORMATION

(71) Applicant: International Business Machines Corporation, Armonk, NY (US)

(72) Inventors: Venkateswara Madduri, Bangalore (IN); Sriram Raghavan, Bangalore (IN); Narendran Sachindran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 13/854,105

(22) Filed: Mar. 31, 2013

(65) Prior Publication Data

US 2014/0297262 A1 Oct. 2, 2014

(51) Int. Cl.
*G06F 17/00* (2006.01)
*G06F 17/30* (2006.01)

(52) U.S. Cl.
CPC ............... *G06F 17/30985* (2013.01)

(58) Field of Classification Search
CPC ................................ G06F 17/30985
USPC ........................................ 707/742
See application file for complete search history.

(56) References Cited

U.S. PATENT DOCUMENTS

| | | | | |
|---|---|---|---|---|
| 6,757,647 | B1 * | 6/2004 | Nathan | G06F 17/22 704/10 |
| 7,308,446 | B1 | 12/2007 | Panigrahy et al. | |
| 8,266,135 | B2 | 9/2012 | Chen et al. | |
| 8,266,169 | B2 | 9/2012 | Bobrow et al. | |
| 8,326,819 | B2 | 12/2012 | Indeck et al. | |
| 2006/0101000 | A1 * | 5/2006 | Hacigumus | G06F 17/30619 707/999.003 |
| 2008/0114725 | A1 * | 5/2008 | Indeck | G06F 17/30864 707/999.002 |
| 2009/0228273 | A1 * | 9/2009 | Wang | G06F 3/04883 704/235 |
| 2010/0161615 | A1 * | 6/2010 | Lee | G06F 21/80 707/741 |
| 2010/0174718 | A1 * | 7/2010 | Chen | G06F 17/30613 707/741 |
| 2011/0167063 | A1 * | 7/2011 | Tengli | G06F 17/30834 707/737 |
| 2012/0124064 | A1 * | 5/2012 | Syrowitz | G06F 17/30985 707/754 |
| 2012/0240185 | A1 * | 9/2012 | Kapoor | H04L 63/1425 726/1 |
| 2012/0290736 | A1 | 11/2012 | McMillen | |
| 2013/0110839 | A1 * | 5/2013 | Kirshenbaum | G06F 17/30705 707/740 |
| 2014/0164352 | A1 * | 6/2014 | Denninghoff | H03H 9/02622 707/711 |

OTHER PUBLICATIONS

Cho, Junghoo et al., "A Fast Regular Expression Indexing Engine," Proceedings of the 18th International Conference on Data Engineering, ICDE 2002, San Jose, California, USA, Feb. 26-Mar. 1, 2002, pp. 1-12, IEEE, Washington, DC, USA.
Chen, Ting, "Indexing Text Documents for Fast Evaluation of Regular Expressions," Doctoral Dissertation, Jul. 7, 2012, 105 pages, University of Wisconsin-Madison, USA.
Chan, Chee-Yong et al., "RE-Tree: An Efficient Index Structure for Regular Expressions," Proceedings of the 28th VLDB Conference, Hong Kong, China, Aug. 20-23, 2002, 12 pages.
Zobel, Justin et al., "Searching Large Lexicons for Partially Specified Terms using Compressed Inverted Files," Proceedings of the 19th VLDB Conference, Dublin, Ireland, Aug. 24-27, 1993, 12 pages.

* cited by examiner

*Primary Examiner* — Rehana Perveen
*Assistant Examiner* — Tiffany Thuy Bui
(74) *Attorney, Agent, or Firm* — Ference & Associates LLC (57) ABSTRACT

Methods and arrangements for evaluating a regular expression. Text strings are received. A regular expression is also received, the regular expression comprising a pattern for specifying and recognizing at least one text string from among the received text strings. There is generated, with respect to the received text strings, a data structure containing grams with positional information. The data structure is employed to evaluate the regular expression via identifying a subset of the text strings comprising at least one match for the given regular expression. Other variants and embodiments are broadly contemplated herein.

12 Claims, 9 Drawing Sheets

FIG. 1

| Gram | Position |
|---|---|
| jan | 1 |
| an1 | 2 |
| an\d | 2 |
| n1, | 3 |
| n\d, | 3 |
| 1,7 | 4 |
| \d,\d | 4 |
| ,70 | 5 |
| ,\d\d | 5 |
| 70$ | 6 |
| \d\d\ | 6 |
| 0$$ | 7 |
| \d$$ | 7 |

| PGI Runtime | Runtime Details | Post-processing Details |
|---|---|---|
| Grade 1: Simple match | • Corresponds to typical inverted index runtimes such as Lucene<br>• Runtime returns the list of strings that match the given positional query<br>• Since short circuit evaluation is used, a string is added to the result set as long as one match is found -- independent of whether there are multiple matches for the positional query within the same string | • Evaluate the original input regex on each candidate string returned by the PGI runtime<br>• Only output those candidate strings that match the regex |
| Grade 2: Complete positional match | • No short circuit evaluation is performed -- for each string that matches the positional query, returns EVERY matching region<br>• E.g., return would be of the form (stringID, start, end) | • Evaluate the original input regex only on the regions (substrings) returned by the Grade 2 runtime<br>• Output any string that contain at least one substring that matches the regex |
| Grade 3: Complete positional match with full lineage | • In addition to what Grade 2 does, this runtime will provide full lineage for each matching span<br>• In other words, each result from a Grade 3 runtime will not only pin point the actual matching region but also specify the matching regions for each subquery of the overall positional query, all the way down to the leaf level terms in the positional query | • Evaluate only the Kleene-closure sub-expressions from the original regex on the substrings determined by the start-end positions of the corresponding enclosing sub query<br>• From the list of candidate strings returned by the runtime, output only those that contain matches for all the Kleene-closure sub-expressions |

ACCELERATED REGULAR EXPRESSION EVALUATION USING POSITIONAL INFORMATION

BACKGROUND

Generally, regular expressions (also referred to as "regex" or "regex's"), which are essentially patterns for specifying and recognizing text strings, represent a fundamental tool in all forms of processing over semi-structured or unstructured data sets. Some uses of regular expressions include flexible matching & pattern-based lookup, and pattern-based filtering. They also are used extensively in information extraction (IE). Generally, the ease of use and extensive support for regular expressions, across many if not all high level programming and scripting languages, has led to a very broad adoption of regular expressions.

More recently, there has emerged a new class of enterprise applications that involve analytics over massive volumes of unstructured and semi-structured data. These applications involve, e.g., machine log analytics, social media analytics, customer voice analytics, among a great variety of others. The analytic workflows that power these applications make extensive use of regular expressions. However, the task of evaluating regular expressions can be a very expensive and resource-intensive task. In this vein, regex computations often dominate the overall costs of many IE tasks, and such costs have continued to increase considerably as the volumes of data being processed themselves grow exponentially.

BRIEF SUMMARY

In summary, one aspect of the invention provides a method of evaluating a regular expression in computing, said method comprising: utilizing a processor to execute computer code configured to perform the steps of: receiving text strings; receiving a regular expression, the regular expression comprising a pattern for specifying and recognizing at least one text string from among the received text strings; generating, with respect to the received text strings, a data structure containing grams with positional information; and employing the data structure to evaluate the regular expression via identifying a subset of the text strings comprising at least one match for the given regular expression.

Another aspect of the invention provides an apparatus for evaluating a regular expression in computing, said apparatus comprising: at least one processor; and a computer readable storage medium having computer readable program code embodied therewith and executable by the at least one processor, the computer readable program code comprising: computer readable program code configured to receive text strings; computer readable program code configured to receive a regular expression, the regular expression comprising a pattern for specifying and recognizing at least one text string from among the received text strings; computer readable program code configured to generate, with respect to the received text strings, a data structure containing grams with positional information; and computer readable program code configured to employ the data structure to evaluate the regular expression via identifying a subset of the text strings comprising at least one match for the given regular expression.

An additional aspect of the invention provides a computer program product for evaluating a regular expression in computing, said computer program product comprising: a computer readable storage medium having computer readable program code embodied therewith, the computer readable program code comprising: computer readable program code configured to receive text strings; computer readable program code configured to receive a regular expression, the regular expression comprising a pattern for specifying and recognizing at least one text string from among the received text strings; computer readable program code configured to generate, with respect to the received text strings, a data structure containing grams with positional information; and computer readable program code configured to employ the data structure to evaluate the regular expression via identifying a subset of the text strings comprising at least one match for the given regular expression.

An additional aspect of the invention provides a method of evaluating a regular expression, said method comprising: receiving a corpus of text strings; developing a positional gram index with respect to the corpus of text strings; said developing comprising: generating all grams of a predetermined fixed size with respect to the corpus of text strings; including positional information with respect to the grams; and incorporating a configurable list of meta-characters into the positional gram index; and evaluating a regular expression with respect to the corpus of text strings.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 7 provides an overview of different variants of regular expression filtering.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-7. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 9. In accordance with an example embodiment, most if not all of the process steps, components and outputs discussed with respect to FIGS. 1-7 can be performed or utilized by way of a processing unit or units and system memory such as those indicated, respectively, at 16' and 28' in FIG. 9, whether on a server computer, a client computer, a node computer in a distributed network, or any combination thereof.

Generally, in accordance with at least one embodiment of the invention, two operations are involved in speeding up regex computations, both of which involve the application of a regular expression against a collection of text strings. For one, filtering involves determining which strings in the collection contain one or more matches for the given regular expression. For another, evaluation involves, for each string in the collection that has at least one match, identifying the actual matching regions (or sub strings).

Generally, in accordance with at least one embodiment of the invention, there can be involved two approaches for speeding up regex evaluation. In one approach, faster regex engines can be developed, which helps with both filtering and evaluation. Generally, most engines are designed for evaluation with filtering as a secondary consideration (or "side effect"). In another approach, a target collection of strings is indexed, and indexing-based approaches typically address solely filtering.

In accordance with at least one embodiment of the invention, by way of speeding up regex computations, there is broadly contemplated herein a technique for exploiting a positional gram index built over a target text collection. Since a positional gram index can be realized using the capabilities of a typical inverted index, such an approach permits efficient regex filtering using standard inverted indexing libraries (e.g., Lucene™, MG4J, etc.). (Lucene™ is a registered trademark of the Apache Software Foundation. MG4J [Managing Gigabytes for Java] is a full-text search engine for large documents written in Java®, itself a registered trademark of Sun Microsystems, Inc.) Additionally, it will be appreciated that, apart from regex filtering, evaluation can be accomplished as an additional step where identified candidate strings identified are subjected to full regex evaluation using a standard regex engine. An advantage to such a two-step process can be found in that filtering, as broadly contemplated herein, can end up reducing the number of strings against which the full regex has to be evaluated.

Figure 1:
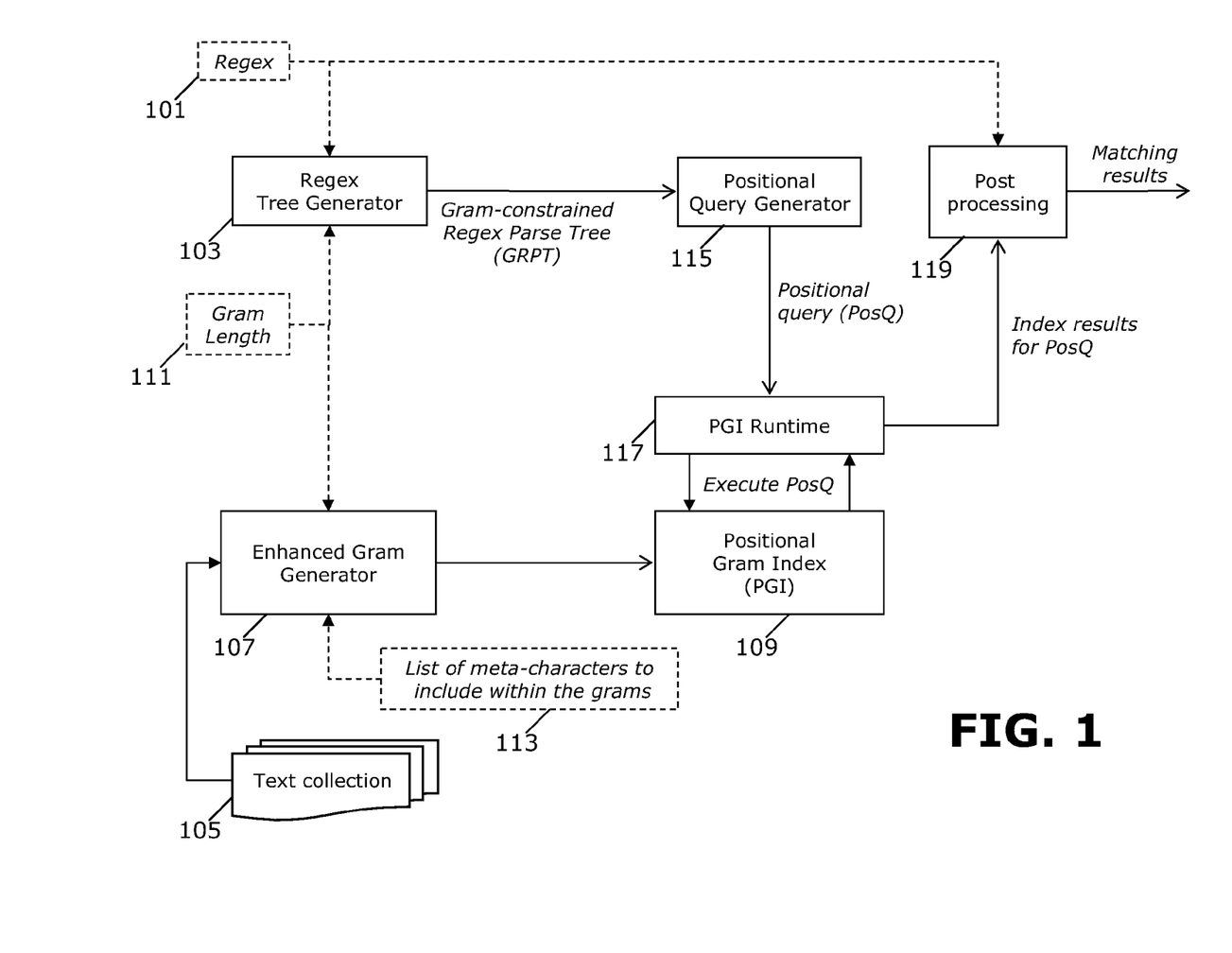
FIG. 1 schematically illustrates a system architecture.

FIG. 1 schematically illustrates a system architecture, in accordance with at least one embodiment of the invention. As shown, a regex 101 is fed to a regex tree generator 103. Text strings, or a text collection 105, are fed to an enhanced gram generator 107, which itself creates a positional gram index (PGI) 109 based on an input gram length and a list of meta-characters 113 to include with the grams. Based on the input gram length 111, a gram-constrained regex parse tree (GRPT) is created by regex tree generator 103.

In accordance with at least one embodiment of the invention, a positional query generator 115 generates a positional query (PosQ) based on the GRPT. The query is executed, via a PGI runtime application 117, on the PGI 109. Results of the execution are then combined with the original regex 101 for post-processing 119, thereby yielding a set of matching results.

Figure 2:
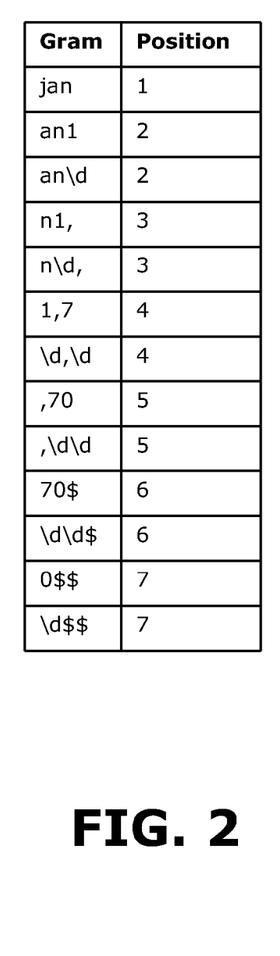
FIG. 2 depicts an enhanced gram list.

FIG. 2 depicts an enhanced gram list (i.e., a list of grams along with position information), in accordance with at least one embodiment of the invention, as may be derived from an enhanced gram generator. As such, the enhanced gram generator enhances a normal gram tokenizer with additional grams (the meta-characters discussed herein) that contain one or more symbols used to denote regex character classes (e.g., "$" to denote end of string, "\d" to denote numerals, "\s" to denote whitespace, etc.). For example, given an input of gram length 3, and the two meta-characters "$" and "\d" to index, and given the string "Jan1,70", the enhanced gram generator (with case folding, i.e., converting all characters to lower-case) will generate the enhanced gram list of FIG. 2. Accordingly, by using an enhanced gram generator as such, it can be appreciated that it is easy to engage with a standard. With such a gram generator, it is easy plug into a normal inverted indexing library to build a positional gram index (PGI).

In accordance with at least one embodiment of the invention, when it is desired to execute a query, a first step in regex filtering involves converting the input regex into a GRPT. Generally, in GRPT Generation, the regex is converted into a canonical form that contains only the disjunction ('|') and Kleene closure ('*') operators using transformations such as:

a+→aa*;
a?→a|null;

a{2}→aa; and a{2,3}→aa|aaa.

Recursively, a parse tree can then be constructed by using the following set of rules:

(1) For each 'l' operator, construct a corresponding OR node in the tree with each term of the '|' operator becoming a child of the OR node.

(2) For each set of terms separated by a '*', construct a corresponding AND node in the tree, with each term becoming a child of the AND node.

(3) For each leaf node containing a term larger than the index gram size, split the term into multiple sub-terms, each of which is no larger than the gram size. Construct an AND node which consists of the sub-terms as children.

Figure 3:
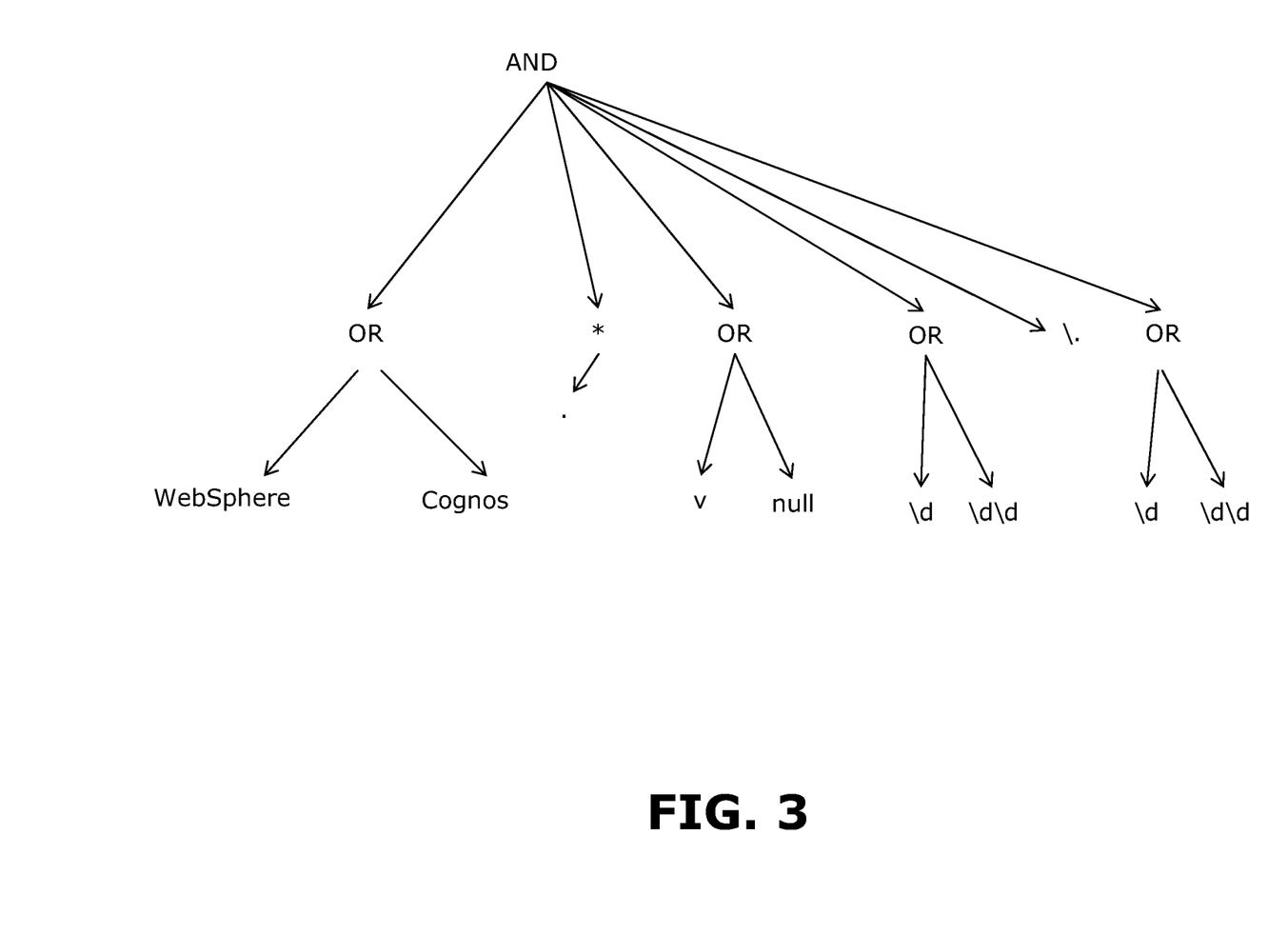
FIG. 3 schematically illustrates a regular expression tree.

By way of an illustrative and non-restrictive example, FIG. 3 schematically illustrates a regular expression tree, in accordance with at least one embodiment of the invention. In this example, the regex query is:

WebSphere|Cognos).*v?\d{1,2}\.\d{1,2} and the index gram size is 6. A transformation is then undertaken to canonical form:

.*(WebSphere|Cognos).*(v|null)(\d|\d\d)\.(\d|\d\d)

Then, a conversion is undertaken to a regex tree as shown in FIG. 3.

Figure 4:
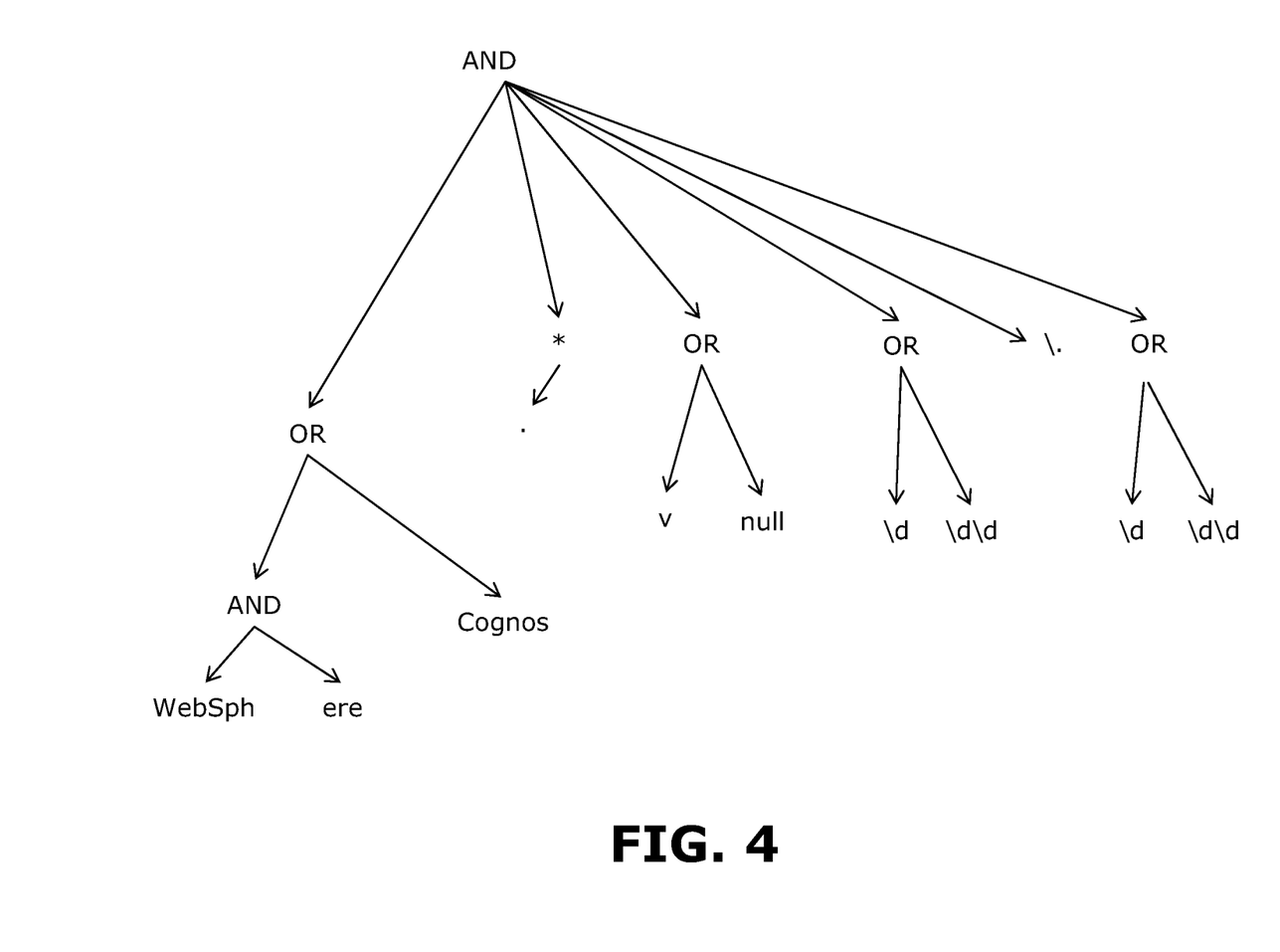
FIG. 4 schematically illustrates a regular expression tree with a split large term.

Continuing, FIG. 4 schematically illustrates a regular expression tree with a split large term, in accordance with at least one embodiment of the invention. In other words, large terms are split on the basis of input index gram size; thus, "WebSphere" here is split into "WebSph" and "ere" on the basis of a gram size of 6.

Figure 5:
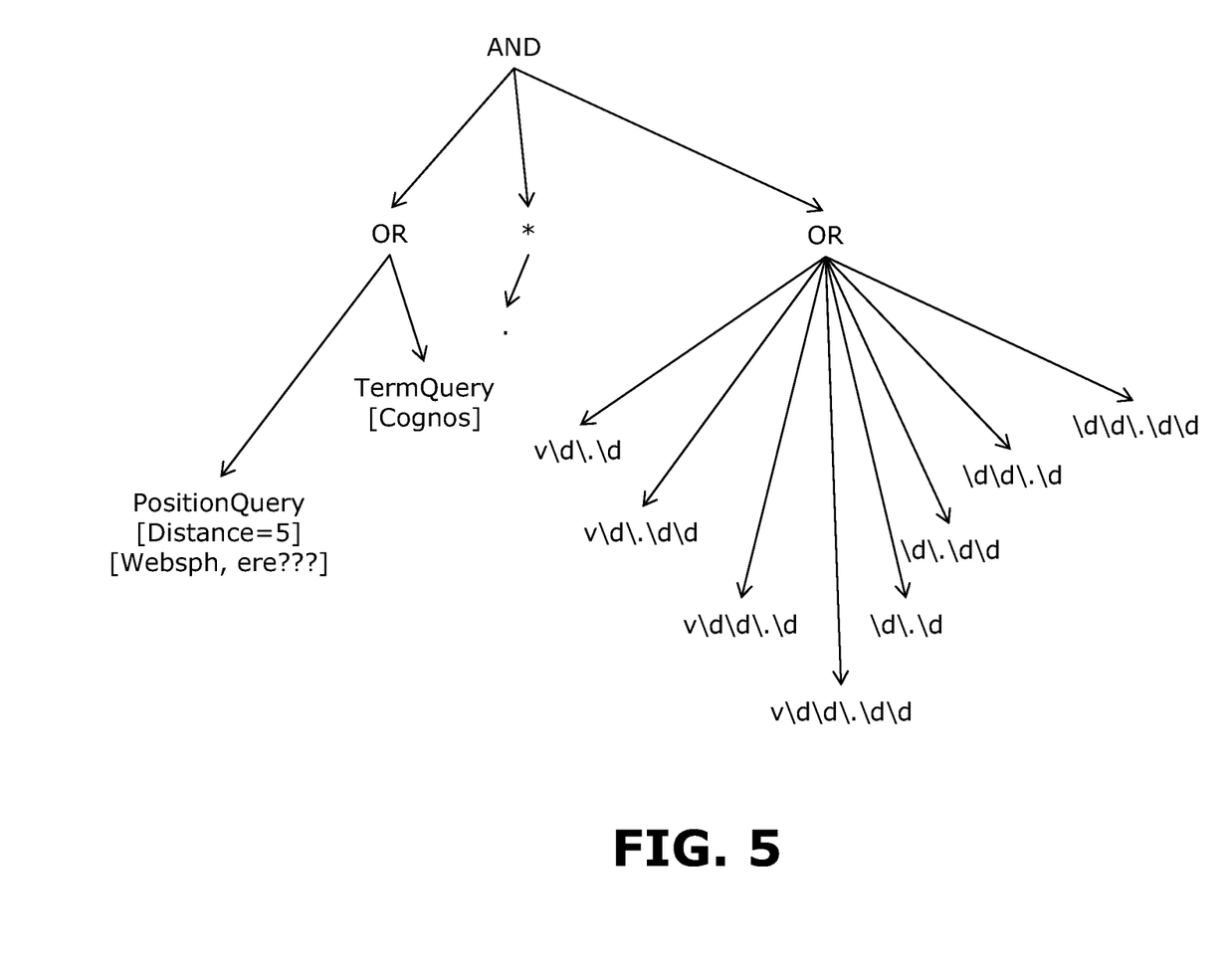
FIGS. 5 and 6 schematically illustrate an example of positional query generation.
Figure 6:
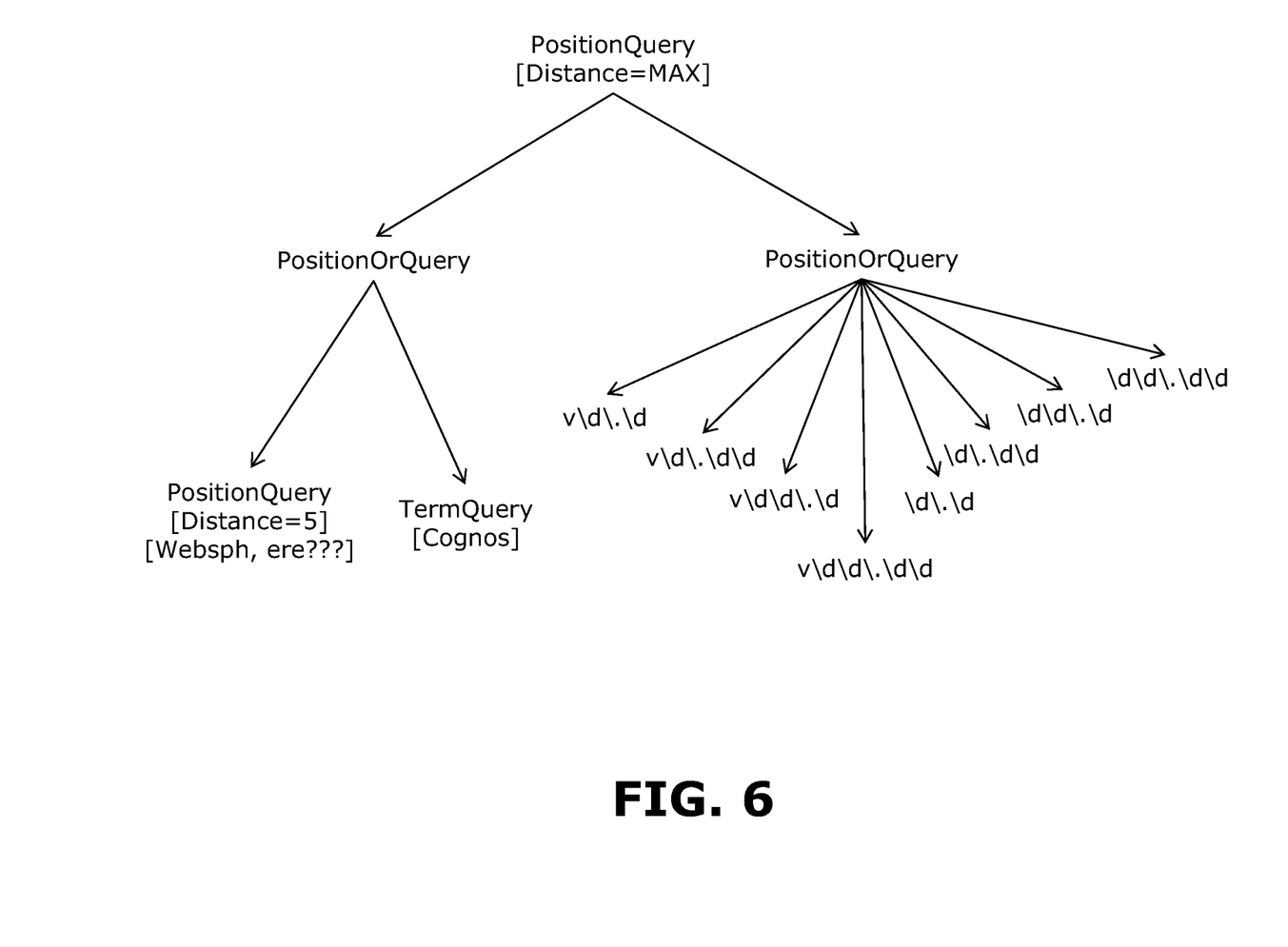

In accordance with at least one embodiment of the invention, all leaf terms smaller than the input gram length are then transformed into an index prefix query. Thus, for every OR node having an AND node as a parent and non-wildcard leaf node children, all possible combinations of the child node values are generated, and all newly generated leaf terms thereby obtained, and that are larger than the input gram length, are transformed into a positional query with each term having a maximum length of the input gram length (or GramLength). Then, for every AND node, a positional query is created as follows. If two adjacent terms are non-Kleene closure, create a positional query with the two terms and a distance constraint=GramLength−1. If two non-Kleene closure terms are separated by one or more Kleene closure terms, create a positional query with the two non-Kleene closure terms and a distance constraint of infinity. As such, FIGS. 5 and 6 schematically illustrate an example of positional query generation.

In accordance with at least one embodiment of the invention, given a positional gram index (PGI) generated using a gram generator and a positional query as described herein, filtering is achieved using a sequence of two steps. In a first step, a positional query is run on the PGI to retrieve a list of candidate strings that could potentially match the input regex, In a second step, the list of candidate strings is post-processed to compute the final filtered set of strings that match the given regex. Depending on the runtime capabilities of the PGI, there are different possible implementations for this method; an overview of such possibilities is set forth in FIG. 7.

Figure 8:
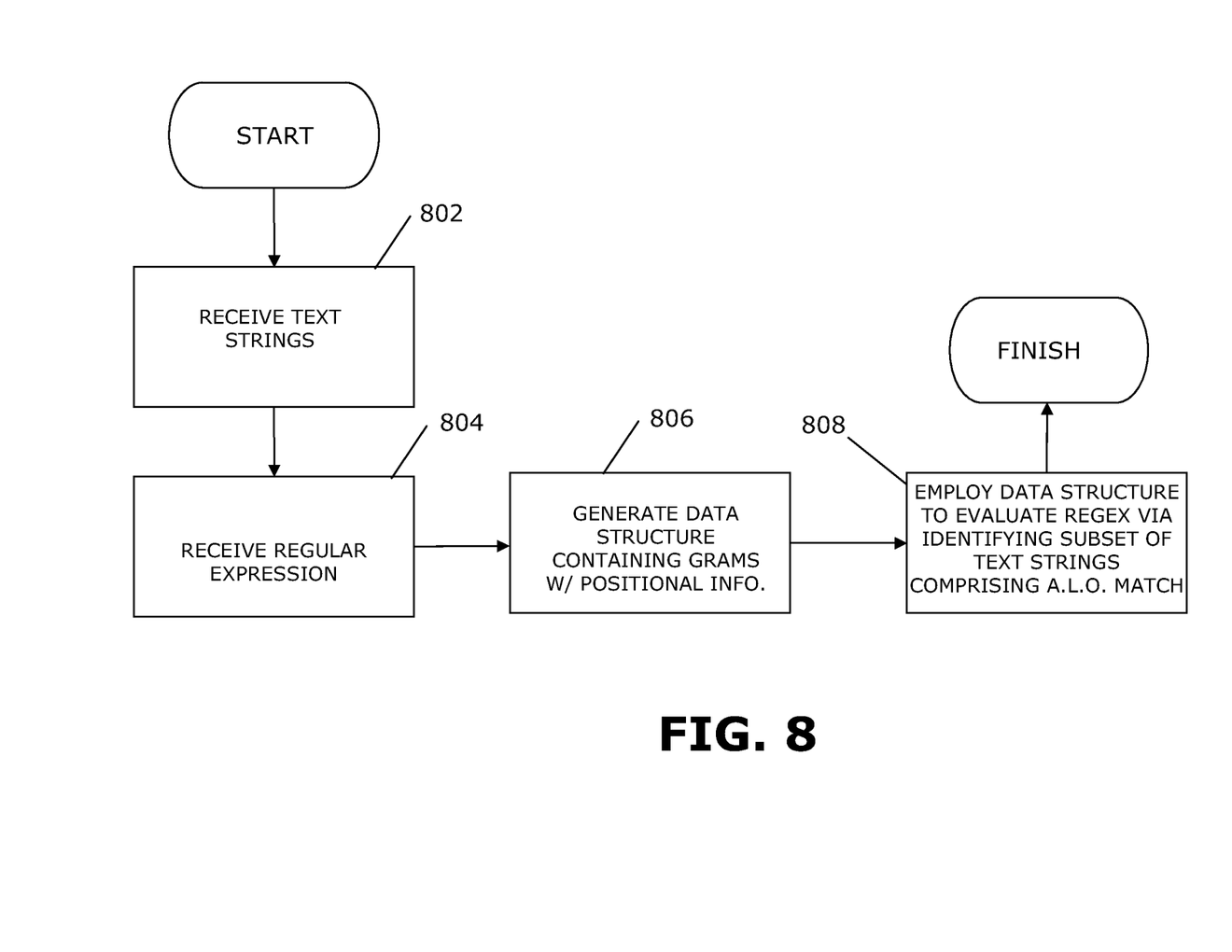
FIG. 8 sets forth a process more generally for evaluating a regular expression.

FIG. 8 sets forth a process more generally for evaluating a regular expression, in accordance with at least one embodiment of the invention. It should be appreciated that a process such as that broadly illustrated in FIG. 8 can be carried out on essentially any suitable computer system or set of computer systems, which may, by way of an illustrative and non-restrictive example, include a system such as that indicated at 12' in FIG. 9. In accordance with an example embodiment, most if not all of the process steps discussed with respect to FIG. 8 can be performed by way of a processing unit or units and system memory such as those indicated, respectively, at 16' and 28' in FIG. 9.

As shown in FIG. 8, in accordance with at least one embodiment of the invention, text strings are received (802). A regular expression is also received, the regular expression comprising a pattern for specifying and recognizing at least one text string from among the received text strings (804). There is generated, with respect to the received text strings, a data structure containing grams with positional information (806). The data structure is employed to evaluate the regular expression via identifying a subset of the text strings comprising at least one match for the given regular expression (808).

Figure 9:
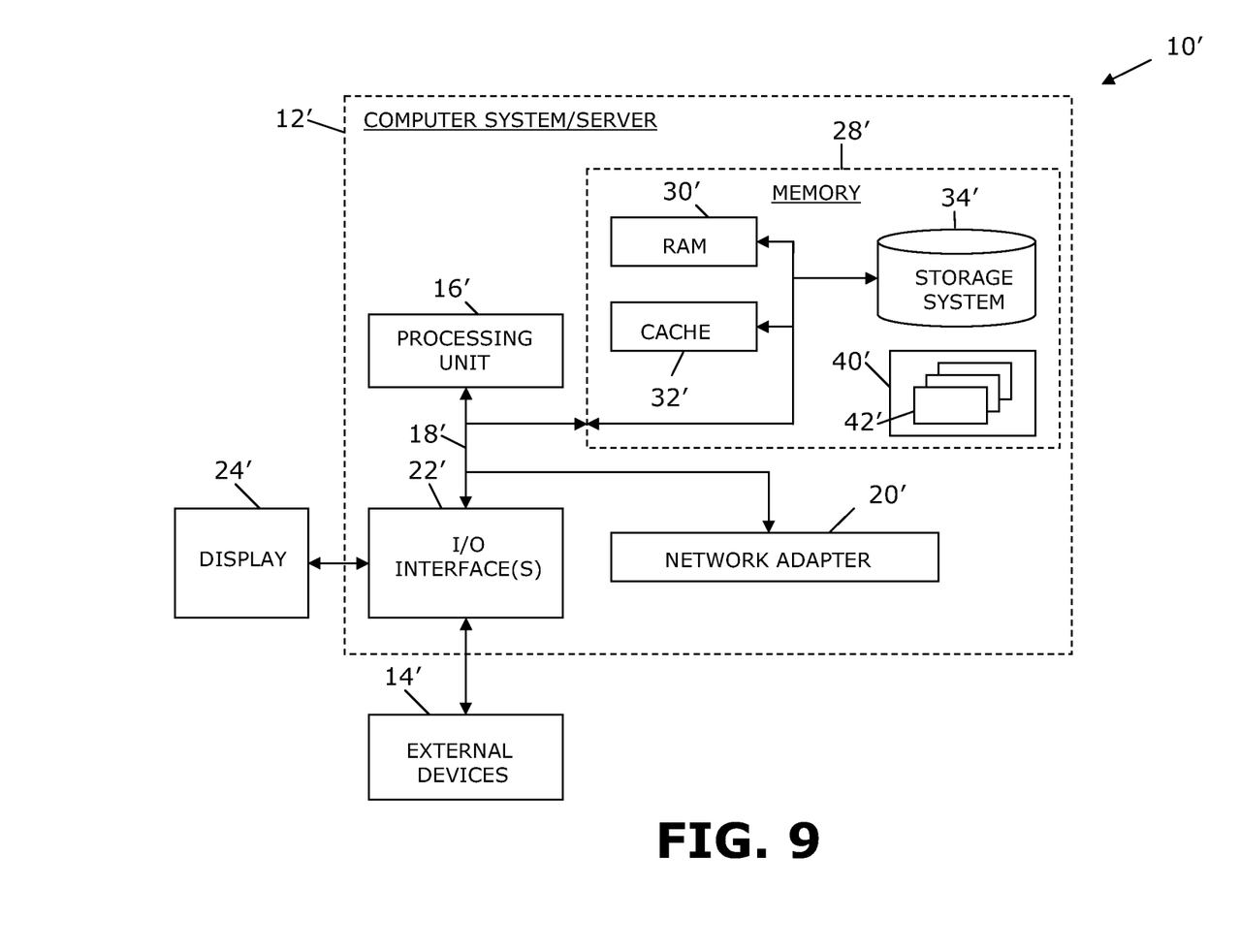
FIG. 9 illustrates a computer system.

Referring now to FIG. 9, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of evaluating a regular expression in computing, said method comprising:
    utilizing a processor to execute computer code configured to perform the steps of:
    receiving text strings;
    generating, using the received text strings and a list of regular expression meta-characters, a data structure containing a plurality of grams with positional information identifying a location of each of the plurality of grams within the received text strings, wherein the grams are of a certain character length based upon an input gram length;
    receiving a query comprising a regular expression, wherein the regular expression comprises a pattern for recognizing at least one text string from among the received text strings;
    converting the regular expression into a gram-constrained parse tree comprising nodes comprising character classes and nodes comprising a gram having a character length equal to the input gram length;
    generating a positional index query based on the gram-constrained parse tree; and
    identifying, within the data structure, a subset of the text strings comprising at least one match for the query, wherein the identifying comprises filtering the data structure by executing the positional index query on the data structure to generate a list of candidate text strings and filtering the list of candidate text strings against the regular expression to generate the subset of text strings.

2. The method according to claim 1, wherein the meta-characters are derived from a configurable list.

3. The method according to claim 1, wherein said generating comprises building an inverted index containing the grams along with positional information related to the grams.

4. The method according to claim 1, wherein said filtering the list of candidate text strings comprises post-processing, the post-processing being governed by a level of detail returned within optional response metadata generated with the list of candidate text strings.

5. The method according to claim 4, wherein:
    said post-processing comprises employing runtime post-processing logic; and
    the runtime post-processing logic is governed by the level of detail returned in the optional response metadata.

6. An apparatus for evaluating a regular expression in computing, said apparatus comprising:
    at least one processor; and
    a non-transitory computer readable storage medium having computer readable program code embodied therewith and executable by the at least one processor, the computer readable program code comprising:
    computer readable program code configured to receive text strings;
    computer readable program code configured to generate, using the received text strings and a list of regular expression meta-characters, a data structure containing a plurality of grams with positional information identifying a location of each of the plurality of grams within the received text strings, wherein the grams are of a certain character length based upon an input gram length;
    computer readable program code configured to receive a query comprising a regular expression, wherein the regular expression comprises a pattern for recognizing at least one text string from among the received text strings;
    computer readable program code configured to convert the regular expression into a gram-constrained parse tree comprising nodes comprising character classes and nodes comprising a gram having a character length equal to the input gram length; computer readable program code configured to generate a positional index query based on the gram-constrained parse tree; and
    computer readable program code configured to identify a subset of the text strings comprising at least one match for the query, wherein to identify comprises filtering the data structure by executing the positional index query on the data structure to generate a list of candidate text strings and filtering the list of candidate text strings against the regular expression to generate the subset of text strings.

7. A computer program product for evaluating a regular expression in computing, said computer program product comprising:
    a non-transitory computer readable storage medium having computer readable program code embodied therewith, the computer readable program code comprising:
    computer readable program code configured to receive text strings;
    computer readable program code configured to generate, using the received text strings and a list of regular expression meta-characters, a data structure containing a plurality of grams with positional information identifying a location of each of the plurality of grams within the received text strings, wherein the grams are of a certain character length based upon an input gram length;

computer readable program code configured to receive a query comprising a regular expression, wherein the regular expression comprises a pattern for recognizing at least one text string from among the received text strings;

computer readable program code configured to convert the regular expression into a gram-constrained parse tree comprising nodes comprising character classes and nodes comprising a gram having a character length equal to the input gram length;

computer readable program code configured to generate a positional index query based on the gram-constrained parse tree; and computer readable program code configured to identify a subset of the text strings comprising at least one match for the query, wherein to identify comprises filtering the data structure by executing the positional index query on the data structure to generate a list of candidate text strings and filtering the list of candidate text strings against the regular expression to generate the subset of text strings.

8. The computer program product according to claim 7, wherein the meta-characters are derived from a configurable list.

9. The computer program product according to claim 7, wherein said computer readable program code is configured to build an inverted index containing the grams along with positional information related to the grams.

10. The computer program product according to claim 7, wherein said computer readable program code is configured to filter the list of candidate text strings via post-processing, the post-processing being governed by a level of detail returned within optional response metadata generated with the list of candidate text strings.

11. The computer program product according to claim 10, wherein:

the post-processing employs runtime post-processing logic; and the runtime post-processing logic is governed by the level of detail returned in the optional response metadata.

12. A method of evaluating a regular expression, said method comprising:

receiving a corpus of text strings;

developing a positional gram index with respect to the corpus of text strings;

said developing comprising:

generating all grams from the corpus of text strings of a predetermined fixed size based upon an input gram length;

including, within the positional gram index, positional information associated with the gram, wherein the position information indicates a location of each of the grams within the corpus of text strings; and incorporating a configurable list of meta-characters into the positional gram index; and evaluating a regular expression with respect to the corpus of text strings, wherein the evaluating comprises:

converting the regular expression into a gram-constrained parse tree comprising nodes comprising character classes and nodes comprising a gram having a character length equal to an input gram length;

generating a positional index query based on the gram-constrained parse tree; and identifying a subset of text strings within the corpus of text strings matching the regular expression, wherein the identifying comprises filtering the positional gram index by executing the positional index query on the positional gram index to generate a list of candidate text strings and filtering the list of candidate text strings against the regular expression to generate the subset of text strings.

* * * * *